J. K. HOLLAND.
Fertilizer.
No. 7,491. Patented July 9. 1850.
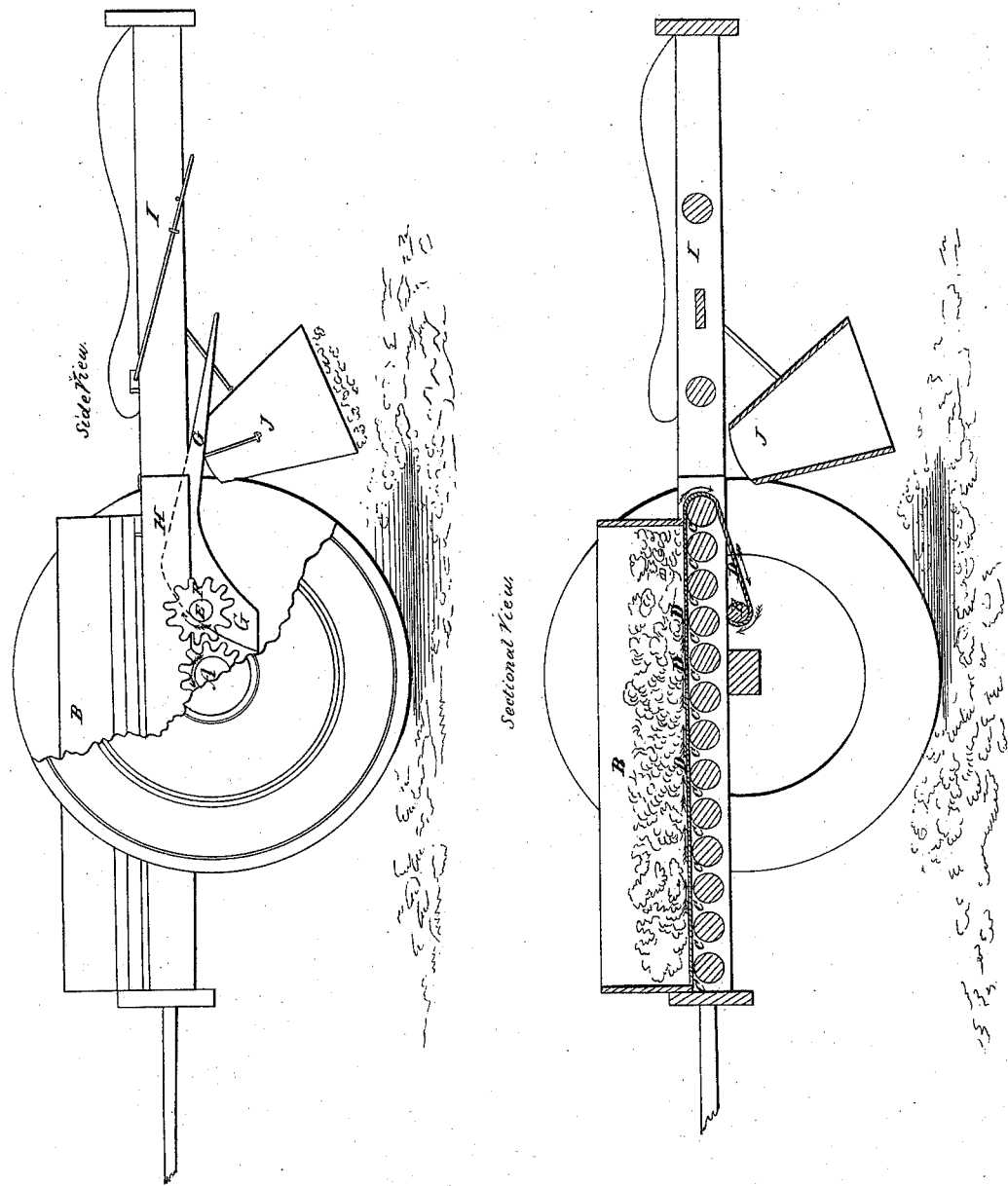

UNITED STATES PATENT OFFICE.

J. K. HOLLAND, OF BEAUFORT COUNTY, NORTH CAROLINA.

IMPROVEMENT IN CARTS FOR SPREADING MANURE.

Specification forming part of Letters Patent No. 7,491, dated July 9, 1850.

*To all whom it may concern:*

Be it known that I, JOEL K. HOLLAND, of the county of Beaufort and State of North Carolina, have invented a new and useful machine for scattering manure on land, and the name of it is a "Manure-Scattering Cart;" and I do hereby declare that the following is a full, clear, and exact description of the construction and operation of the same, reference being had to the drawings, making a part of this specification.

The body and wheels are simply a cart with a cog-wheel, A, attached to one hub of the cart-wheels, and in the bottom of the cart is laid a bed of round rollers, c c c, and upon these rollers is a box, B, for the purpose of holding the manure, and the bottom D of which box is made of leather or gutta-percha, which extends to and is attached to a cylinder, E, or shaft, to the end of which is a cog-wheel, F. The box should be filled with manure while it lies on the bed of rollers, and when the cart is drawn to the place where the manure is to be spread you bear on the lever G, which is on the hind part of one of the shafts, H, that connects the two cog-wheels, and upon the moving of the cart by a horse or ox the bottom of the box is wound upon the cylinder, and the box gradually goes back on a bearer, I, for the box, which is very light and attached on the hind part of the cart, and as the box moves back the manure gradually spreads the width of the box.

When the manure is to be spread in a drill the hopper J is attached to the end of the shafts and the bearer of the box. After the box is emptied of its load it can be easily pushed back again on the forward part of the cart for filling again.

The great desideratum of this invention is the saving of labor and having the manure spread of an equal thickness.

Having thus fully described my invention, I do not claim any of the parts taken separately; but

What I do claim, and desire to secure by Letters Patent, is—

The combination of the box B, bottom D, rollers C, cylinder E, cog-wheels F and A, and lever G, arranged and operated substantially in the manner herein described.

J. K. HOLLAND.

Witnesses:
  N. F. CHAMBERS,
  I. SABARBE.